(12) United States Patent
Usami et al.

(10) Patent No.: US 11,197,429 B2
(45) Date of Patent: Dec. 14, 2021

(54) PLANT ILLUMINATION APPARATUS

(71) Applicant: FUJIFILM Corporation, Tokyo (JP)

(72) Inventors: Yoshihisa Usami, Ashigara-kami-gun (JP); Mitsuyoshi Ichihashi, Ashigara-kami-gun (JP); Kazuhiro Oki, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 16/268,631

(22) Filed: Feb. 6, 2019

(65) Prior Publication Data

US 2019/0174682 A1 Jun. 13, 2019

Related U.S. Application Data

(63) Continuation of application No. PCT/JP2017/028082, filed on Aug. 2, 2017.

(30) Foreign Application Priority Data

Aug. 16, 2016 (JP) .............................. JP2016-159490

(51) Int. Cl.
*A01G 7/04* (2006.01)
*F21V 9/14* (2006.01)
(Continued)

(52) U.S. Cl.
CPC ................ *A01G 7/045* (2013.01); *A01G 7/00* (2013.01); *F21S 2/00* (2013.01); *F21V 9/14* (2013.01); *G02B 5/30* (2013.01); *G02B 5/3016* (2013.01)

(58) Field of Classification Search
None
See application file for complete search history.

(56) References Cited

U.S. PATENT DOCUMENTS

| 2014/0041296 A1 | 2/2014 | Ichihashi et al. |
| 2015/0075069 A1 | 3/2015 | Ichihashi et al. |

(Continued)

FOREIGN PATENT DOCUMENTS

| JP | 2008-228688 A | 10/2008 |
| JP | 2012-226229 A | 11/2012 |

(Continued)

OTHER PUBLICATIONS

Shibayev et al., "The Effect of Circularly Polarized Light on the Growth of Plants", International Journal of Botany, 2011, vol. 7, No. 1, pp. 113-117 (total 5 pages).

(Continued)

*Primary Examiner* — Ashok Patel
(74) *Attorney, Agent, or Firm* — Sughrue Mion, PLLC

(57) ABSTRACT

An object is to provide a plant illumination apparatus that can output light having a high degree of circular polarization in the target wavelength range. This object is achieved by having a reflective-type polarizing plate having an effective wavelength range, a light-emitting device, and a reflective plate configured to reflect light emitted from the light-emitting device and satisfying:

$$\lambda 1 > \lambda 2, \lambda 2 > \lambda 3, \text{ and } w > 30 \text{ nm}$$

wherein $\lambda 1$ is the center wavelength of the effective wavelength range of the reflective-type polarizing plate, $\lambda 2$ is the center wavelength of the light-emitting device, w is the full width at half maximum of the transmittance of the reflective-type polarizing plate, and $\lambda 3$ is the shorter wavelength of the wavelengths at the full width at half maximum.

8 Claims, 2 Drawing Sheets

(51) Int. Cl.
    *A01G 7/00*     (2006.01)
    *F21S 2/00*     (2016.01)
    *G02B 5/30*     (2006.01)

(56) References Cited

U.S. PATENT DOCUMENTS

2015/0101246 A1*    4/2015    Usami .................... A01G 7/045
                                                                              47/58.1 LS
2016/0025303 A1      1/2016    Usami et al.

FOREIGN PATENT DOCUMENTS

| JP | 2013-243971 A | 12/2013 |
|---|---|---|
| JP | 2014-092611 A | 5/2014 |
| JP | 2014-183785 A | 10/2014 |

OTHER PUBLICATIONS

Communication dated Jul. 22, 2019 from European Patent Office in counterpart EP Application No. 17841381.1.
International Search Report for PCT/JP2017/028082 dated Nov. 7, 2017 [PCT/ISA/210].
International Preliminary Report on Patentability with Translation of Written Opinion of the International Search Authority for PCT/JP2017/028082 dated Feb. 19, 2019.
Written Opinion of the International Searching Authority for PCT/JP2017/028082 dated Nov. 7, 2017 [PCT/ISA/237].

* cited by examiner

PLANT ILLUMINATION APPARATUS

CROSS-REFERENCE TO RELATED APPLICATIONS

This application is a Continuation of PCT International Application No. PCT/JP2017/028082 filed on Aug. 2, 2017, which claims priority under 35 U.S.C. § 119(a) to Japanese Patent Application No. 2016-159490 filed on Aug. 16, 2016. The above application is hereby expressly incorporated by reference, in its entirety, into the present application.

BACKGROUND OF THE INVENTION

1. Field of the Invention

The present invention relates to plant illumination apparatuses for the promotion and control of plant growth.

2. Description of the Related Art

In a plant factory, which is a system whose internal environment is controlled for planned plant production in a closed or semi-closed space, plant growth is controlled by regulating conditions such as temperature, fertilizer, light irradiation time, and illuminance of irradiation light.

It is thought that the polarization state of light may have a certain effect on, for example, plant growth. For example, JP2008-228688A discloses a biological behavior control apparatus including a polarized light irradiation mechanism. This publication discloses that, in an experiment using this apparatus, irradiation with red right-handed circularly polarized light alone promoted the growth of *Arabidopsis thaliana*.

As such an illumination apparatus for the control of plant growth by irradiation with particular circularly polarized light, a plant illumination apparatus described in JP2012-226229A is known.

This illumination apparatus includes a light source and a polarization state control member that controls the polarization state of light emitted from the light source. The polarization state control member is configured to convert the polarization state of light emitted from the light source into circular polarization in a portion of the wavelength range of the light so that, of the irradiation light, light in the control wavelength range has a degree of circular polarization of 0.3 or more.

SUMMARY OF THE INVENTION

The illumination apparatus described in JP2012-226229A, which is an illumination apparatus for the promotion and control of plant growth, requires fewer components for polarization state control.

To promote plant growth, it is advantageous that the irradiation light have a higher degree of circular polarization in the target wavelength range where plant growth is promoted. Light having a degree of circular polarization of 0.3 or more in the control wavelength range is suitable for promoting plant growth.

As an example polarization state control member for polarization state control, the illumination apparatus described in JP2012-226229A uses a reflective-type circularly polarizing plate. Light is incident at various angles on the reflective-type circularly polarizing plate.

However, if light is obliquely incident on the reflective-type circularly polarizing plate, the wavelength range where light is converted into certain circularly polarized light is shifted (moved) to shorter wavelengths. As a result, the circularly polarized light with which plants are irradiated would contain light with wavelengths shorter than the target control wavelength range. That is, it may be difficult for the illumination apparatus described in JP2012-226229A to output light having a sufficiently high degree of circular polarization in the target control wavelength range, depending on factors such as the light source used and the shape of the reflective plate that reflects light emitted from the light source toward the polarization state control member.

An object of the present invention is to solve the foregoing problem with the related art, that is, to provide a plant illumination apparatus, for the promotion and control of plant growth, that can output light having a high degree of circular polarization in the target wavelength range where plant growth is promoted.

To achieve the foregoing object, the present invention provides a plant illumination apparatus having a reflective-type polarizing plate having an effective wavelength range, a light-emitting device, and a reflective plate configured to reflect light emitted from the light-emitting device. The plant illumination apparatus satisfies:

$$\lambda1 > \lambda2, \lambda2 > \lambda3, \text{ and } w > 30 \text{ nm}$$

wherein $\lambda1$ is the center wavelength of the effective wavelength range of the reflective-type polarizing plate, $\lambda2$ is the center wavelength of the emission of the light-emitting device, $w$ is the width between the two wavelengths at the half transmittance $T_{1/2}$ of the minimum transmittance $T_{min}$ of the reflective-type polarizing plate, and $\lambda3$ is the shorter wavelength of the two wavelengths at the half transmittance $T_{1/2}$. The half transmittance $T_{1/2}$ is expressed by the following equation:

$$\text{half transmittance } T_{1/2} = 100 - (100 - T_{min})/2$$

In the plant illumination apparatus according to the present invention, $\lambda2$ and $\lambda4$ preferably satisfy $\lambda2 < \lambda4$, wherein $\lambda4$ is the shorter wavelength of the wavelengths at the transmittance $T_{80}$ of the reflective-type polarizing plate. The transmittance $T_{80}$ is expressed by the following equation:

$$\text{transmittance } T_{80} = 100 - (100 - T_{min}) \times 0.8$$

In addition, $\lambda1$ and $\lambda2$ preferably satisfy $\lambda1 - \lambda2 > 10$ nm.
In addition, $\lambda1$ and $\lambda2$ preferably satisfy $\lambda1 - \lambda2 < 300$ nm.
In addition, the reflective-type polarizing plate is preferably a reflective-type circularly polarizing plate.
In addition, the reflective-type circularly polarizing plate preferably has a cholesteric liquid crystal layer or has a linearly polarizing reflective plate and a $\lambda/4$ plate.
In addition, the reflective plate preferably reflects the light emitted from the light-emitting device by specular reflection or diffuse reflection.
In addition, $\lambda2$ is preferably 560 to 760 nm.
The plant illumination apparatus preferably further has a second light-emitting device having a center wavelength shorter than the effective wavelength range of the reflective-type polarizing plate.

The plant illumination apparatus according to the present invention can output light containing a large proportion of the target component, i.e., right-handed circularly polarized light or left-handed circularly polarized light, that is, light having a high degree of circular polarization, in the target wavelength range where plant growth is promoted, thereby appropriately promoting and controlling plant growth.

DESCRIPTION OF THE PREFERRED EMBODIMENTS

A preferred example plant illumination apparatus according to the present invention will hereinafter be described in detail with reference to the accompanying drawings.

As used herein, any numerical range expressed with "to" is meant to include the values recited before and after "to" as its lower and upper limits.

Figure 1:
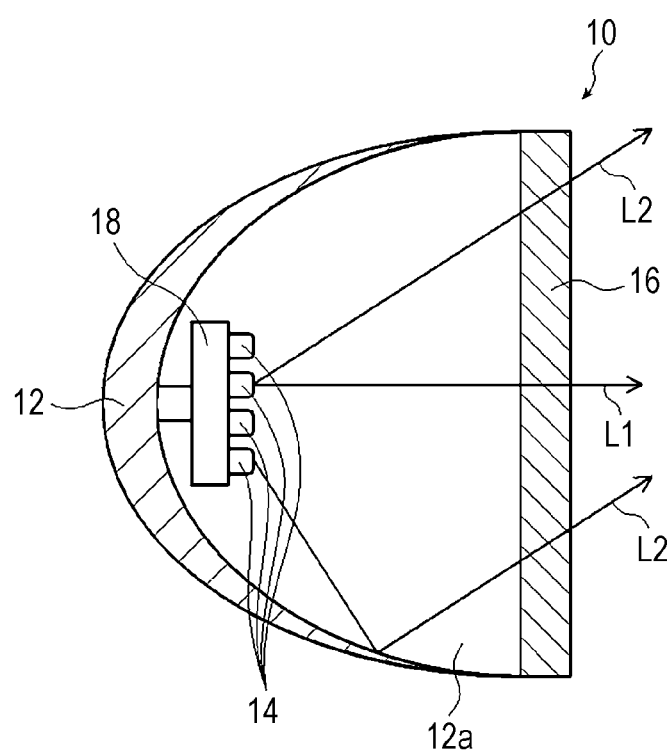
FIG. 1 conceptually illustrates an example plant illumination apparatus according to the present invention.

FIG. 1 conceptually shows a sectional view of an example plant illumination apparatus according to the present invention.

A plant illumination apparatus 10 shown in FIG. 1 is an apparatus for irradiating plants with certain circularly polarized light (light with certain circular polarization) in a certain wavelength range where plant growth is promoted. The plant illumination apparatus 10 has a housing 12, light sources 14, a reflective-type circularly polarizing plate 16, and a support 18. In the following description, "plant illumination apparatus 10" is also referred to as "illumination apparatus 10".

The housing 12 constitutes a reflective plate in the present invention. The light sources 14 constitute a light-emitting device in the present invention. The reflective-type circularly polarizing plate 16 constitutes a reflective-type polarizing plate in the present invention.

In addition to the members shown in the figure, the illumination apparatus 10 may optionally have various members used for known illumination apparatuses (light irradiation apparatuses), such as reflective members, heat-dissipating members, infrared-absorbing members, ultraviolet-absorbing members, lenses, prisms, and control circuits for switching on and off the light sources 14.

The reflective-type circularly polarizing plate 16 of the illumination apparatus 10 according to the present invention has an effective wavelength range. The reflective-type circularly polarizing plate 16 reflects left-handed circularly polarized light and transmits right-handed circularly polarized light in the effective wavelength range. Alternatively, the reflective-type circularly polarizing plate 16 reflects right-handed circularly polarized light and transmits left-handed circularly polarized light in the effective wavelength range. The reflective-type circularly polarizing plate 16 also transmits all light outside the effective wavelength range.

Thus, the light transmitted through the reflective-type circularly polarizing plate 16 contains only left-handed circularly polarized light or right-handed circularly polarized light (contains a large proportion of left-handed circularly polarized light or right-handed circularly polarized light) in the effective wavelength range. In other words, plants are irradiated with only left-handed circularly polarized light or right-handed circularly polarized light in the effective wavelength range.

The illumination apparatus 10 according to the present invention satisfies:

$$\lambda 1 > \lambda 2, \lambda 2 > \lambda 3, \text{ and } w > 30 \text{ nm}$$

wherein $\lambda 1$ is the center wavelength of the effective wavelength range of the reflective-type circularly polarizing plate 16, $\lambda 2$ is the center wavelength of the emission of the light sources 14, w is the width between the two wavelengths at the half transmittance $T_{1/2}$ of the minimum transmittance $T_{min}$ of the reflective-type circularly polarizing plate 16, and $\lambda 3$ is the shorter wavelength of the two wavelengths at the half transmittance $T_{1/2}$. The half transmittance $T_{1/2}$ is expressed by the following equation:

$$\text{half transmittance } T_{1/2} = 100 - (100 - T_{min})/2$$

In the present invention, the center wavelength $\lambda 1$ of the effective wavelength range of the reflective-type circularly polarizing plate 16 is the wavelength at the highest reflectance in the effective wavelength range, that is, the wavelength at the lowest transmittance, i.e., the minimum transmittance $T_{min}$, in the effective wavelength range. In the present invention, transmittance (reflectance) refers to transmittance for light incident perpendicular to the reflective-type circularly polarizing plate 16, that is, transmittance for an incidence angle of 0°.

On the other hand, the center wavelength of the emission of the light sources 14 is the wavelength at the maximum emission of the light sources 14, that is, the wavelength at the maximum peak of the emission spectral characteristics of the light sources 14. In the following description, "the center wavelength of the emission of the light sources 14" is also simply referred to as "the center wavelength of the light sources 14".

This configuration allows the illumination apparatus 10 according to the present invention to output light containing a large proportion of the target circularly polarized light (circularly polarized component), that is, light having a high degree of circular polarization, in the target wavelength range where plant growth is promoted, thereby appropriately promoting and controlling plant growth.

In other words, this configuration allows the illumination apparatus 10 according to the present invention to irradiate plants with light containing a large proportion of circularly polarized light (circularly polarized component) that contributes to plant growth in a particular wavelength range where plant growth can be promoted.

The polarization state of light can be expressed by the sum of right-handed circular polarization and left-handed circular polarization. For example, if the left-handed circular polarization and the right-handed circular polarization have equal intensity, the sum is linear polarization, with its electric vector oscillating in the orientation determined by the phase difference between the left-handed circular polarization and the right-handed circular polarization. If the right-handed circular polarization and the left-handed circular polarization have different intensities, the resulting state is elliptic polarization. If there is only one of the two components, the resulting state is perfect circular polarization.

The sense of circular polarization, as viewed such that light travels toward the viewer, is right-handed if the head of the electric field vector rotates clockwise with increasing time, and is left-handed if the head of the electric field vector rotates counterclockwise with increasing time.

The degree of circular polarization is defined as:

$$|I_R - I_L|/(I_R + I_L)$$

where $I_R$ is the intensity of the right-handed circular polarization of the light, and $I_L$ is the intensity of the left-handed circular polarization of the light. Light having a higher degree of circular polarization contains a higher proportion of right-handed circularly polarized light or left-handed circularly polarized light.

The polarization state of the light emitted from the light sources 14 for each wavelength can be measured with a spectroradiometer or spectrometer equipped with a circularly polarizing plate. In this case, the measured intensity of light transmitted through a right-handed circularly polarizing plate corresponds to $I_R$, whereas the measured intensity of light transmitted through a left-handed circularly polarizing plate corresponds to $I_L$. Normal light sources such as incandescent lamps, mercury lamps, fluorescent lamps, and light-emitting diodes (LEDs) emit almost natural light. The polarization characteristics of natural light transmitted through the reflective-type circularly polarizing plate 16 and natural light reflected by the reflective-type circularly polarizing plate 16 can be measured, for example, with an AxoScan polarization phase difference analyzer available from Axometrics, Inc.

Housing 12 and Support 18

As described above, the illumination apparatus 10 has the housing 12, the light sources 14, the reflective-type circularly polarizing plate 16, and the support 18.

In the example shown in the figure, the housing 12 has, for example, a bowl-shaped (mortar-shaped) inner surface, with the support 18 secured to the bottom thereof and the light sources 14 mounted on the support 18. The opening of the housing 12 is closed by the reflective-type circularly polarizing plate 16.

The inner surface 12a of the housing 12 is a reflective surface that reflects light emitted from the light sources 14 toward the reflective-type circularly polarizing plate 16. That is, the housing 12 is a so-called reflector and constitutes a reflective plate in the present invention.

The inner surface 12a may be a known light-reflective surface used for a reflector. Thus, the reflection of light on the inner surface 12a may be specular reflection, like reflection on a metal or metal compound, or may be diffuse reflection, like reflection on a diffuse reflection plate having light scattering particles dispersed therein.

The inner surface 12a of the housing 12 is not limited to bowl shapes, but may instead be of various shapes used for various known reflectors, such as spherical and elliptical shapes.

The housing 12 may be formed of various materials that have sufficient resistance to light and heat emitted from the light sources 14.

The support 18 supporting the light sources 14 is secured to the bottom of the housing 12.

The support 18 may have a suitable shape selected so that the light sources 14 can be properly supported, depending on, for example, the shape, type, and number of light sources 14 supported. As with the housing 12, the support 18 may be formed of various materials that have sufficient resistance to light and heat emitted from the light sources 14.

Light Sources 14

The light sources 14 may be any type of light source that can emit light with a wavelength at which the growth of the target plant for the illumination apparatus 10 can be controlled, including various light sources (light-emitting devices).

Examples of light sources (light-emitting elements) include fluorescent lamps, LEDs, discharge lamps such as mercury lamps, tungsten lamps, laser lights, organic light-emitting diodes (OLEDs), metal halide lamps, and xenon lamps. Of these, LEDs are preferred from the viewpoint of efficiency.

These light sources may be used in combination with filters that reflect or transmit light in a particular wavelength range and/or phosphors that convert wavelength.

The center wavelength λ2 of the light sources 14 may be a suitable wavelength selected depending on the target plant for the illumination apparatus 10.

Generally, irradiation with red light is suitable for promoting plant growth (weight increase). Accordingly, the center wavelength λ2 of the light sources 14 is preferably 560 to 760 nm, more preferably 600 to 720 nm, even more preferably 630 to 690 nm, particularly preferably 660 nm.

The example illumination apparatus 10 shown in the figure has four light sources 14. However, the number of light sources 14 in the illumination apparatus according to the present invention is not limited to four, but may be a suitable number selected depending on, for example, the output light intensity and luminance required of the illumination apparatus 10.

Thus, the illumination apparatus 10 may have three or fewer light sources 14 or may have five or more light sources 14.

Reflective-Type Circularly Polarizing Plate 16

As described above, the reflective-type circularly polarizing plate 16 is a reflective-type circularly polarizing plate having an effective wavelength range. The effective wavelength range is also referred to as the control wavelength range or the selective reflection wavelength range.

As described above, of the incident light, the reflective-type circularly polarizing plate 16 reflects left-handed circularly polarized light and transmits right-handed circularly polarized light in the effective wavelength range, that is, in a particular wavelength range. Alternatively, the reflective-type circularly polarizing plate 16 reflects right-handed circularly polarized light and transmits left-handed circularly polarized light in the effective wavelength range. Of the incident light, the reflective-type circularly polarizing plate 16 basically reflects all light outside the effective wavelength range except for incidentally absorbed components.

The reflective-type circularly polarizing plate 16 may be any suitable reflective-type circularly polarizing plate selected depending on the purpose. For example, the reflective-type circularly polarizing plate 16 may be (1) a reflective-type circularly polarizing plate 16 having a cholesteric liquid crystal layer or (2) a reflective-type circularly polarizing plate 16 composed of a linearly polarizing reflective plate and a λ/4 plate.

(1) Reflective-Type Circularly Polarizing Plate 16 Having Cholesteric Liquid Crystal Layer As described above, the cholesteric liquid crystal layer used for the reflective-type circularly polarizing plate 16 of the illumination apparatus 10 according to the present invention has an effective wavelength range. For the reflective-type circularly polarizing plate 16 having a cholesteric liquid crystal layer, the cholesteric liquid crystal layer has an effective wavelength range. That is, the cholesteric liquid crystal layer of the reflective-type circularly polarizing plate 16 reflects certain circularly polarized light, i.e., exhibits selective reflection (selective reflection of circularly polarized light), in the effective wavelength range.

Examples of liquid crystal phases that exhibit selective reflection in the effective wavelength range include cholesteric liquid crystal phases and chiral smectic liquid crystal phases, both of which have a helical structure. A liquid crystal material that exhibits a cholesteric liquid crystal phase or a chiral smectic liquid crystal phase can be formed by mixing an achiral liquid crystal compound with a chiral agent. As an alternative method, such a liquid crystal material can also be obtained by copolymerizing these compounds into a polymer liquid crystal or a polymer film.

As described above, the center wavelength $\lambda 1$ of the reflective-type circularly polarizing plate 16 and the center wavelength $\lambda 2$ of the light sources 14 of the illumination apparatus 10 satisfy $\lambda 1 > \lambda 2$.

Thus, the cholesteric liquid crystal layer that has an effective wavelength range, that is, that exhibits selective reflection of circularly polarized light, needs to be adjusted to have a selective reflection center wavelength $\lambda 1$ corresponding to the center wavelength $\lambda 2$ of the light sources 14.

The selective reflection properties of the cholesteric liquid crystal layer, that is, the center wavelength $\lambda 1$ of the effective wavelength range, depend on the pitch length P (=helical period) of the helical structure of the cholesteric or chiral smectic phase and follow the relationship $\lambda 1 = n \times P$, where n is the average refractive index of the cholesteric liquid crystal phase. Thus, the selective reflection center wavelength $\lambda 1$ can be adjusted by adjusting the pitch length P of the helical structure. Since the pitch length P depends on the type and concentration of the chiral agent added to the liquid crystal composition, these can be adjusted to achieve the desired pitch length P.

The full width at half maximum $\Delta\lambda$ of the effective wavelength range (i.e., the half transmittance $T_{1/2}$) depends on the birefringence $\Delta n$ of the liquid crystal compound and the pitch length P of the helical structure and follows the relationship $\Delta\lambda = \Delta n \times P$. Thus, the width of the effective wavelength range can be controlled by adjusting $\Delta n$. $\Delta n$ can be adjusted, for example, by adjusting the type of liquid crystal used and, if a plurality of liquid crystals are used, the mixing ratio of the liquid crystals and controlling the temperature during alignment fixation. Alternative techniques for increasing the width of the effective wavelength range include stacking two or more cholesteric liquid crystal layers such that the pitch lengths P thereof are shifted from each other and varying the pitch in the thickness direction of the cholesteric liquid crystal layer.

For the reflective-type circularly polarizing plate 16 having a cholesteric liquid crystal layer, the wavelength range where the cholesteric liquid crystal layer exhibits such selective reflection (selective reflection properties) is the effective wavelength range (selective reflection wavelength range).

In selective reflection, if the twisted direction (sense) of the helix of the cholesteric liquid crystal is right-handed, the cholesteric liquid crystal layer reflects right-handed circularly polarized light and transmits left-handed circularly polarized light. Alternatively, if the sense is left-handed, the cholesteric liquid crystal layer reflects left-handed circularly polarized light and transmits right-handed circularly polarized light.

Thus, if irradiation is performed with left-handed circularly polarized light and not with right-handed circularly polarized light in the effective wavelength range, that is, in plant growth control, a cholesteric liquid crystal layer having a right-handed sense of twist is used for the reflective-type circularly polarizing plate 16. Alternatively, if irradiation is performed with right-handed circularly polarized light and not with left-handed circularly polarized light, a cholesteric liquid crystal layer having a left-handed sense of twist is used for the reflective-type circularly polarizing plate 16.

The constituent materials of the cholesteric liquid crystal layer and a method for forming the cholesteric liquid crystal layer will hereinafter be described.

The cholesteric liquid crystal layer is a layer formed by fixing a cholesteric liquid crystal phase. The cholesteric liquid crystal layer can be formed from a cholesteric liquid crystal composition prepared by dissolving, in a solvent, a liquid crystal compound, a chiral agent, other additives that are optionally added (e.g., air interface alignment control agents, polymerization initiators, crosslinking agents, and surfactants), and other optional constituents.

Liquid Crystal Compound

Preferred liquid crystal compounds that can be used to form the cholesteric liquid crystal layer include low-molecular-weight liquid crystal compounds and polymer liquid crystal compounds. More preferred are low-molecular-weight liquid crystal compounds, which require a shorter alignment time and have a higher alignment evenness.

The liquid crystal compound preferably has a polymerizable group. More preferably, the liquid crystal compound exhibits a nematic phase or a chiral smectic phase. The molecular shape is preferably discotic or calamitic. Calamitic molecules are more preferred from the viewpoint of productivity, whereas discotic molecules are more preferred if it is important to reduce the angular dependence of the width of selective reflection.

Suitable liquid crystal compounds include calamitic nematic liquid crystal compounds having a polymerizable group or having no polymerizable group. Calamitic nematic liquid crystal compounds having no polymerizable group are described in various documents (e.g., Y. Goto et. al., Mol. Cryst. Liq. Cryst. 1995, Vol. 260, pp. 23-28).

Suitable discotic compounds, having a polymerizable group, that can be used include the compounds described in JP1996-27284A (JP-H8-27284A), JP2001-100028A, and JP2006-76992A. The use of a combination of two or more polymerizable nematic liquid crystal compounds inhibits crystal precipitation during coating and alignment and decreases the alignment temperature.

The polymerizable group may be introduced into the liquid crystal compound in any known manner. The polymerizable group may be any suitable polymerizable group selected depending on the purpose, including unsaturated polymerizable groups, epoxy groups, thioepoxy groups, oxetane groups, thietanyl groups, aziridinyl groups, pyrrole groups, fumarate groups, cinnamoyl groups, isocyanate groups, isothiocyanate groups, amino groups, hydroxyl groups, carboxyl groups, alkoxysilyl groups, mercapto groups, vinyl groups, allyl groups, methacryloyl groups, and acryloyl groups.

For example, if the liquid crystal compound is a polymerizable nematic liquid crystal compound, the liquid crystal compound preferably has one or more polymerizable groups selected from the group consisting of unsaturated polymerizable groups, epoxy groups, and aziridinyl groups, more preferably an unsaturated polymerizable group, particularly preferably an ethylenically unsaturated polymerizable group.

These polymerizable groups may be used alone or in combination of two or more.

Chiral Agent

The chiral agent (chiral compound (optically active compound)) used for the cholesteric liquid crystal composition may be any known chiral agent. Examples of chiral agents that can be used include the compounds described in "Liquid Crystal Device Handbook, Chapter 3, Section 4-3, Chiral Agents for TN and STN, p. 199, edited by the 142nd Committee of the Japan Society for the Promotion of Science, 1989", isosorbide derivatives, and isomannide derivatives.

Whereas chiral agents typically include an asymmetric carbon atom, axially chiral compounds and planarly chiral compounds, which include no asymmetric carbon atom, can also be used.

Examples of axially chiral compounds and planarly chiral compounds include binaphthyls, helicenes, paracyclophanes, and derivatives thereof.

It is preferred to select the chiral agent for inducing a helical structure in the cholesteric liquid crystal phase depending on the purpose since different compounds induce helices with different senses and pitches. The sense and pitch of the helix can be measured by the methods described in "Ekisho Kagaku Jikken Nyumon (Introduction to Experimental Liquid Crystal Science", edited by the Japanese Liquid Crystal Society, published by Sigma Publishing, 2007, p. 46 and "Ekisho Binran (Liquid Crystal Handbook)", the Editorial Committee of Ekisho Binran, Maruzen, p. 196.

The chiral agent may have a polymerizable group.

If the chiral agent has a polymerizable group, for example, a polymer having a repeating unit of a nematic liquid crystal and an optically active structure can be formed by the polymerization reaction of a polymerizable nematic liquid crystal compound.

The chiral agent preferably has a polymerizable group similar to the polymerizable group of the liquid crystal compound. Thus, if the liquid crystal compound is a polymerizable nematic liquid crystal compound, the chiral agent preferably has one or more polymerizable groups selected from the group consisting of unsaturated polymerizable groups, epoxy groups, and aziridinyl groups, more preferably an unsaturated polymerizable group, particularly preferably an ethylenically unsaturated polymerizable group.

The chiral agent may also have a photoisomerizable group.

Chiral agents having photoisomerizable groups are preferred since a pattern of the desired reflection wavelength corresponding to the emission wavelength of the light sources 14 can be formed by irradiation with, for example, active radiation through a photomask after coating and alignment. Preferred photoisomerizable groups include isomerizable moieties of photochromic compounds, azo groups, azoxy groups, and cinnamoyl groups. Specific compounds include the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The chiral agent is preferably present in an amount of 0.01 to 200 mole percent, more preferably 1 to 30 mole percent, based on the number of moles of the liquid crystal compound.

Polymerization Initiator

It is preferred to add a polymerization initiator for a polymerization reaction to the cholesteric liquid crystal composition. Polymerization reactions include thermal polymerization reactions with thermal polymerization initiators and photopolymerization reactions with photopolymerization initiators. Of these, photopolymerization reactions with photopolymerization initiators are particularly preferred.

The photopolymerization initiator may be any suitable photopolymerization initiator selected depending on the purpose. Examples of photopolymerization initiators include α-carbonyl compounds, acyloin ethers, α-hydrocarbyl-substituted aromatic acyloin compounds, polynuclear quinone compounds, combinations of triarylimidazole dimers with p-aminophenyl ketones, oxadiazole compounds, halomethylated triazine derivatives, halomethylated oxadiazole derivatives, imidazole derivatives, anthraquinone derivatives, benzanthrone derivatives, benzophenone derivatives, thioxanthone derivatives, acridine derivatives, phenazine derivatives, and oxime derivatives.

The photopolymerization initiator is preferably present in an amount of 0.01% to 20% by mass, more preferably 0.5% to 5% by mass, based on the solid content of the cholesteric liquid crystal composition.

Crosslinking Agent

The cholesteric liquid crystal composition may optionally contain a crosslinking agent to achieve improved film hardness and durability after curing. Suitable crosslinking agents that can be used include those that cure with, for example, ultraviolet light, heat, or moisture.

The crosslinking agent may be any suitable crosslinking agent selected depending on the purpose. Examples of crosslinking agents include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanates; polyoxazoline compounds having an oxazoline side chain; and alkoxysilane compounds such as vinyltrimethoxysilane and N-(2-aminoethyl)-3-aminopropyltrimethoxysilane. Known catalysts may also be used depending on the reactivity of the crosslinking agent to achieve improved productivity in addition to improved film hardness and durability. These may be used alone or in combination of two or more.

The crosslinking agent is preferably present in an amount of 3% to 20% by mass, more preferably 5% to 15% by mass. If the crosslinking agent is present in an amount of 3% by mass or more, the crosslinking agent is sufficiently effective in improving the crosslink density. If the crosslinking agent is present in an amount of 20% by mass or less, the cholesteric liquid crystal layer has sufficient stability.

Air Interface Alignment Control Agent

An air interface alignment control agent, which contributes to stable or quick formation of a planarly aligned cholesteric liquid crystal layer, may be added to the cholesteric liquid crystal composition.

Examples of air interface alignment control agents include fluorine-containing (meth)acrylate polymers and compounds represented by general formula (1), described later. The cholesteric liquid crystal composition may contain two or more air interface alignment control agents selected from the group consisting of these compounds.

These air interface alignment control agents reduce the tilt angle of the liquid crystal compound molecules at the air interface of the cholesteric liquid crystal layer or allow them to be substantially horizontally aligned. In the present invention, "horizontally aligned" means that the major axes of the liquid crystal molecules are parallel to the film plane; however, they need not be exactly parallel. In the present invention, this phrase means that the liquid crystal molecules are oriented at a tilt angle of less than 20° with respect to the horizontal plane.

If the liquid crystal compound is horizontally aligned near the air interface, orientation defects are less likely to occur.

Thus, the cholesteric liquid crystal layer exhibits high transparency outside the effective wavelength range (selective reflection range) and a high degree of polarization in the effective wavelength range. In contrast, if the liquid crystal compound molecules are oriented at a large tilt angle, the helical axis of the cholesteric liquid crystal phase would deviate from the normal to the film plane. This is undesirable because the reflectance would decrease, and the degree of polarization would also decrease due to the occurrence of a fingerprint pattern and the resulting increase in haze and diffraction.

Examples of fluorine-containing (meth)acrylate polymers that can be used as air interface alignment control agents include the compounds described in, for example, paragraphs [0018] to [0043] of JP2007-272185A.

As described above, compounds represented by general formula (1) below are also suitable for use as air interface alignment control agents.

Compounds, represented by general formula (1) below, that can be used as air interface alignment control agents will hereinafter be described.

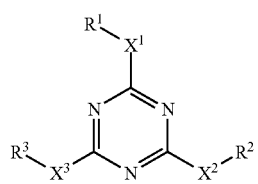

general formula (1)

In general formula (1), $R^1$, $R^2$, and $R^3$ are each independently a hydrogen atom or a substituent, and $X^1$, $X^2$, and $X^3$ are each a single bond or a divalent linking group. Preferred substituents for $R^1$ to $R^3$ include substituted or unsubstituted alkyl groups (in particular, unsubstituted alkyl groups and fluorine-substituted alkyl groups are more preferred), substituted or unsubstituted aryl groups (in particular, aryl groups having fluorine-substituted alkyl groups are preferred), substituted or unsubstituted amino groups, substituted or unsubstituted alkoxy groups, substituted or unsubstituted alkylthio groups, and halogen atoms. The divalent linking groups for $X^1$, $X^2$, and $X^3$ are preferably selected from the group consisting of alkylene groups, alkenylene groups, divalent aromatic groups, divalent heterocyclic residues, —CO—, —NRa— (where Ra is an alkyl group having 1 to 5 carbon atoms or a hydrogen atom), —O—, —S—, —SO—, —SO$_2$—, and combinations thereof. More preferred are divalent linking groups selected from the group consisting of alkylene groups, phenylene groups, —CO—, —NRa-, —O—, —S—, and —SO$_2$— and combinations of at least two divalent linking groups selected from that group. The alkylene groups preferably have 1 to 12 carbon atoms. The alkenylene groups preferably have 2 to 12 carbon atoms. The divalent aromatic groups preferably have 6 to 10 carbon atoms.

Examples of compounds, represented by general formula (1), that can be used as air interface alignment control agents include the compounds described in JP2005-99248A. Compounds represented by general formula (1) may be used alone or in combination of two or more as air interface alignment control agents.

A compound represented by general formula (1) is preferably added to the cholesteric liquid crystal composition in an amount of 0.01% to 10% by mass, more preferably 0.01% to 5% by mass, particularly preferably 0.02% to 1% by mass, based on the total mass of the cholesteric liquid crystal composition.

Surfactant

As described later, the reflective-type circularly polarizing plate 16 having a cholesteric liquid crystal layer is formed by applying to a substrate a cholesteric liquid crystal composition containing a polymerization initiator and a polymerizable liquid crystal compound, drying the coating, and polymerizing (crosslinking or curing) the liquid crystal compound.

To adjust the surface tension of the coating obtained by applying the cholesteric liquid crystal composition to the substrate to achieve uniform thickness, the cholesteric liquid crystal composition preferably contains a surfactant.

A suitable surfactant that does not interfere with alignment may be selected and used.

Examples of suitable surfactants that can be used include nonionic surfactants containing a siloxane group and/or a fluoroalkyl group as a hydrophobic moiety. Particularly suitable are oligomers having two or more hydrophobic moieties per molecule.

Commercially available surfactants may also be used. Examples of commercially available surfactants include PolyFox PF-151N, PF-636, PF-6320, PF-656, PF-6520, PF-3320, PF-651, and PF-652 available from OMNOVA Solutions Inc.; FTERGENT FTX-209F, FTX-208G, and FTX-204D available from NEOS Company Limited; and SURFLON KH-40 available from Seimi Chemical Co., Ltd. Also suitable are the fluorinated compounds described in paragraph [0087] of JP2002-341126A and the fluorinated compounds described in paragraphs [0064] to [0080] and paragraphs [0092] to [0096] of JP2005-99248A.

The surfactant is preferably present in an amount of 0.01% to 1% by mass based on the solid content of the cholesteric liquid crystal composition. If the surfactant is present in an amount of less than 0.01% by mass, orientation defects may occur since the surface tension at the air interface does not decrease sufficiently. If the surfactant is present in an amount of more than 1% by mass, excess surfactant may form an uneven structure on the air interface side, thus decreasing the alignment evenness.

Solvent

The solvent used for the preparation of the cholesteric liquid crystal composition may be any suitable solvent selected depending on the purpose, preferably an organic solvent.

The organic solvent may be any suitable organic solvent selected depending on the purpose. Examples of organic solvents include ketones, alkyl halides, amides, sulfoxides, heterocyclic compounds, hydrocarbons, esters, and ethers. These may be used alone or in combination of two or more. Of these, ketones are particularly preferred from the viewpoint of environmental impact.

As described above, the cholesteric liquid crystal layer can be formed from a cholesteric liquid crystal composition prepared by dissolving, for example, a liquid crystal compound, a chiral agent, and a polymerization initiator in a solvent.

For example, a cholesteric liquid crystal layer with fixed cholesteric regularity (cholesteric phase) can be formed by preparing a cholesteric liquid crystal composition, applying the cholesteric liquid crystal composition to an alignment film on a substrate, optionally drying the coating, aligning the liquid crystal compound, and irradiating the coating having the liquid crystal compound aligned therein with active radiation to polymerize the liquid crystal compound.

That is, this method can be used to fabricate the reflective-type circularly polarizing plate 16 having a cholesteric liquid crystal layer.

If a stack of cholesteric liquid crystal layers are formed, the process of manufacturing a cholesteric liquid crystal layer may be repeated.

The substrate may be formed of any material having sufficient heat resistance and light transmittance. Both inorganic materials and organic materials are suitable for use.

Examples of inorganic materials include glass, quartz, and silicon.

Examples of organic materials include acetate resins such as triacetylcellulose, polyester resins, polyethersulfone resins, polysulfone resins, polycarbonate resins, polyamide resins, polyimide resins, polyolefin resins, acrylic resins, polynorbornene resins, cellulose, polyarylate resins, polystyrene resins, polyvinyl alcohol resins, polyvinyl chloride resins, and polyvinylidene chloride resins. These may be used alone or in combination of two or more.

The alignment film may be formed by known techniques. Example techniques include rubbing treatment of organic compounds and polymers (e.g., resins such as polyimides, polyvinyl alcohol, polyesters, polyarylates, polyamide-imides, polyetherimides, polyamides, and modified polyamides), oblique deposition of inorganic compounds, the formation of layers with microgrooves, and the accumulation of organic compounds (e.g., ω-tricosanoic acid, dimethyldioctadecylammonium chloride, or methyl stearate) by the Langmuir-Blodgett technique (LB films). Also known are alignment films that exhibit an alignment function upon application of an electric or magnetic field or irradiation with light.

Of these, alignment films formed by rubbing treatment of polymers are particularly preferred. Rubbing treatment can be performed by rubbing the surface of a polymer layer with paper and/or cloth several times in a predetermined direction.

The cholesteric liquid crystal composition may be applied to the alignment film by any suitable process selected depending on the purpose.

Example processes include curtain coating processes, extrusion coating processes, direct gravure coating processes, die coating processes, spin coating processes, dip coating processes, spray coating processes, and slide coating processes. Alternatively, a cholesteric liquid crystal composition applied to a support may be transferred to the alignment film.

After the application of the cholesteric liquid crystal composition, the applied cholesteric liquid crystal composition is heated to align the liquid crystal compound. The heating temperature is preferably 200° C. or lower, more preferably 130° C. or lower. This alignment treatment provides an optical thin film in which a liquid crystal compound such as a polymerizable nematic liquid crystal compound is aligned in a twisted configuration such that the liquid crystal compound has its helical axis oriented substantially perpendicular to the plane of the optical thin film.

As described above, after the alignment of the liquid crystal compound, the liquid crystal composition is polymerized.

Polymerization may be performed by known methods such as thermal polymerization and photopolymerization, depending on the liquid crystal compound. Photopolymerization with light irradiation is more preferred than thermal polymerization. Light irradiation is preferably performed with ultraviolet light. The irradiation energy is preferably 20 mJ/cm$^2$ to 50 J/cm$^2$, more preferably 100 to 1,500 mJ/cm$^2$.

To facilitate the photopolymerization reaction, light irradiation may be performed under heating or in a nitrogen atmosphere. The ultraviolet light used for irradiation preferably has a wavelength of 350 to 430 nm. A higher degree of polymerization reaction is preferred from the viewpoint of stability. The degree of polymerization reaction is preferably 70% or more, more preferably 80% or more.

The degree of polymerization reaction can be determined from the proportion of consumed polymerizable functional groups using an infrared (IR) absorption spectrum.

For the reflective-type circularly polarizing plate 16 having a cholesteric liquid crystal layer, the cholesteric liquid crystal layer preferably has a thickness of 0.1 to 50 μm, more preferably 0.5 to 10 μm, particularly preferably 1.5 to 7 μm.

(2) Reflective-Type Circularly Polarizing Plate 16 Composed of Linearly Polarizing Reflective Plate and λ/4 Plate As described above, a reflective-type circularly polarizing plate 16 composed of a linearly polarizing reflective plate and a λ/4 plate may also be used.

Linearly Polarizing Reflective Plate

Examples of linearly polarizing reflective plates include (I) linearly polarizing reflective plates having a multilayer structure, (II) polarizers composed of a stack of thin films with different birefringence, (III) wire grid polarizers, (IV) polarizing prisms, and (V) polarizing plates with scattering anisotropy.

(I) Examples of linearly polarizing reflective plates having a multilayer structure include those composed of a stack of dielectric thin films with different refractive indices.

To provide a wavelength-selective reflective film corresponding to a reflective-type circularly polarizing plate having an effective wavelength range, it is preferred to alternately stack a plurality of dielectric thin films with a high refractive index and a plurality of dielectric thin films with a low refractive index. However, the number of types of dielectric thin films is not limited to two; rather, more than two types of dielectric thin films may be stacked.

It is preferred to stack 2 to 20 layers, more preferably 2 to 12 layers, even more preferably 4 to 10 layers, particularly preferably 6 to 8 layers. If more than 20 layers are stacked, the production efficiency decreases due to multilayer deposition, which may make it impossible to achieve the objects and advantages of the present invention.

The dielectric thin films may be stacked in any suitable order selected depending on the purpose. For example, if the adjacent film has a high refractive index, a film with a lower refractive index than that film is stacked first. Conversely, if the adjacent film has a low refractive index, a film with a higher refractive index than that film is stacked first. The borderline between high and low refractive indices is 1.8. High and low refractive indices are not intended to be absolute; there may be high-refractive-index materials with relatively high and low refractive indices, and they may be alternately used.

Examples of materials for dielectric thin films with high refractive indices include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. Of these, $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$ are preferred. Of these, $SiO$, $Ta_2O_5$, $TiO_2$, $Y_2O_3$, $ZnSe$, $ZnS$, and $ZrO_2$ are particularly preferred.

Examples of materials for dielectric thin films with low refractive indices include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, and $ThF_4$. Of these, $Al_2O_3$, $BiF_3$, $CaF_2$, $MgF_2$, $MgO$, $SiO_2$, and $Si_2O_3$ are preferred, and $Al_2O_3$, $CaF_2$, $MgF_2$, $MgO$, $SiO_2$, and $Si_2O_3$ are particularly preferred.

The materials for the dielectric thin films may have any suitable atomic ratio selected depending on the purpose. The atomic ratio can be adjusted by varying the atmospheric gas concentration during deposition.

The dielectric thin films may be deposited by any suitable process selected depending on the purpose, including vacuum deposition processes such as ion plating and ion beam deposition, physical vapor deposition (PVD) processes such as sputtering, and chemical vapor deposition (CVD) processes. Of these, vacuum deposition processes and sputtering processes are preferred, and sputtering processes are particularly preferred.

A preferred sputtering process is direct-current (DC) sputtering, which has high deposition rate. Materials with high conductivity are preferably used for DC sputtering.

Examples of methods for multilayer deposition by sputtering processes include (1) the one-chamber method, in which films are alternately or sequentially deposited from a plurality of targets in one chamber, and (2) the multi-chamber method, in which films are successively deposited in multiple chambers. Of these, the multi-chamber method is particularly preferred from the viewpoint of productivity and the prevention of material contamination.

The dielectric thin films preferably have a thickness of $\lambda/16$ to $\lambda$, more preferably $\lambda/8$ to $3\lambda/4$, even more preferably $\lambda/6$ to $3\lambda/8$, on the optical wavelength order.

Light propagating through the deposited dielectric layers is partially reflected multiple times by the individual dielectric thin films. The reflected light interferes, and only light with the wavelength determined by the product of the thickness of the dielectric thin films and the refractive index of the films for the light is selectively transmitted. In addition, the central transmission wavelength of the deposited dielectric layers has an angular dependence on the incident light; therefore, the transmission wavelength can be changed by changing the angle of the incident light.

(II) Examples of polarizers composed of a stack of thin films with different birefringence include those described in JP1997-506837A (JP-H9-506837A).

Specifically, polarizers can be formed from a wide variety of materials by processing under conditions selected to achieve a refractive index relationship. In general, a first material needs to have a different refractive index from a second material in a selected direction. This difference in refractive index can be achieved by various techniques, including stretching during or after film formation, extrusion molding, and coating. In addition, the two materials preferably have similar rheological properties (e.g., melt viscosity) so that they can be coextruded.

Commercially available polarizers composed of a stack of thin films with different birefringence may also be used. Examples of such commercially available polarizers include those marketed under the trade name DBEF by 3M Company.

(III) Wire grid polarizers are polarizers that transmit one polarized component and reflect another polarized component by the birefringence of thin metal wires.

Wire grid polarizers, which have a periodic array of metal wires, are mainly used as polarizers in the terahertz range. For a wire grid to function as a polarizer, it is necessary to have a wire pitch sufficiently smaller than the wavelength of the incident electromagnetic radiation.

A wire grid polarizer has metal wires arranged at regular intervals. A wire grid polarizer reflects a component polarized parallel to the longitudinal direction of the metal wires and transmits a component polarized perpendicular to the longitudinal direction of the metal wires.

Commercially available wire grid polarizers may also be used. Examples of commercially available wire grid polarizers include 50×50 and NT46-636 wire grid polarizing filters available from Edmund Optics, Inc.

By adjusting the reflection wavelength range of the linearly polarizing reflective plate for linearly polarized light, a reflective-type circularly polarizing plate having an effective wavelength range can be fabricated.

The wavelength range of the linearly polarized light to be reflected may be adjusted by known techniques, such as adjusting the wire grid pitch of a wire grid polarizer, adjusting the aspect ratio of the cross-sectional shape of a polarizer, and selecting the material for forming a polarizer.

$\lambda/4$ Plate

The $\lambda/4$ plate may be any suitable $\lambda/4$ plate selected depending on the purpose, including stretched polycarbonate films, stretched norbornene polymer films, oriented transparent films containing birefringent inorganic particles such as strontium carbonate, and thin films formed on supports by oblique deposition of inorganic dielectrics.

Examples of $\lambda/4$ plates include (1) the retardation plates described in JP1993-27118A (JP-H5-27118A) and JP1993-27119A (JP-H5-27119A), which include a birefringent film with large retardation and a birefringent film with small retardation that are stacked such that the optical axes thereof are orthogonal to each other; (2) the retardation plate described in JP1998-68816A (JP-H10-68816A), which includes a polymer film having a retardation of $\lambda/4$ at a particular wavelength and a polymer film formed of the same material and having a retardation of $\lambda/2$ at the same wavelength that are stacked so that a retardation of $\lambda/4$ can be achieved over a wide wavelength range; (3) the retardation plate described in JP1998-90521A (JP-H10-90521A), which includes two polymer films that are stacked so that a retardation of $\lambda/4$ can be achieved over a wide wavelength range; (4) the retardation plate described in WO00/26705A, which uses a modified polycarbonate film so that a retardation of $\lambda/4$ can be achieved over a wide wavelength range; and (5) the retardation plate described in WO00/65384A, which uses a cellulose acetate film so that a retardation of $\lambda/4$ can be achieved over a wide wavelength range.

Commercially available $\lambda/4$ plates may also be used. Examples of commercially available $\lambda/4$ plates include the trade name PURE-ACE WR (Teijin Limited).

As described above, the reflective-type circularly polarizing plate 16 has an effective wavelength range. The reflective-type circularly polarizing plate 16 reflects left-handed circularly polarized light or right-handed circularly polarized light and transmits the other light in the effective wavelength range. The reflective-type circularly polarizing plate 16 also transmits all light outside the effective wavelength range.

The reflective-type circularly polarizing plate 16 may have a suitable effective wavelength range selected depending on the target plant for the illumination apparatus 10.

As described above, irradiation with red light is generally suitable for promoting plant growth (weight increase). As described later, light incident on the reflective-type circularly polarizing plate 16 contains a large proportion of obliquely incident light. If light is obliquely incident, the effective wavelength range of the reflective-type circularly polarizing plate 16 shifts to shorter wavelengths.

In view of this, the shorter wavelength side of the effective wavelength range is preferably 500 nm or more, more preferably 540 nm or more, even more preferably 570 nm or more. On the other hand, the longer wavelength side of the effective wavelength range is preferably 700 nm or more, more preferably 740 nm or more, even more preferably 770 nm or more.

Although it is not necessary to set an upper limit to the longer wavelength side of the effective wavelength range, research conducted by the inventors indicates that the effective wavelength range is preferably 1,000 nm or less, more preferably 900 nm or less, even more preferably 800 nm or less.

The effective wavelength range of the reflective-type circularly polarizing plate 16 can be measured, for example, with an AxoScan polarization phase difference analyzer available from Axometrics, Inc.

Figure 2:
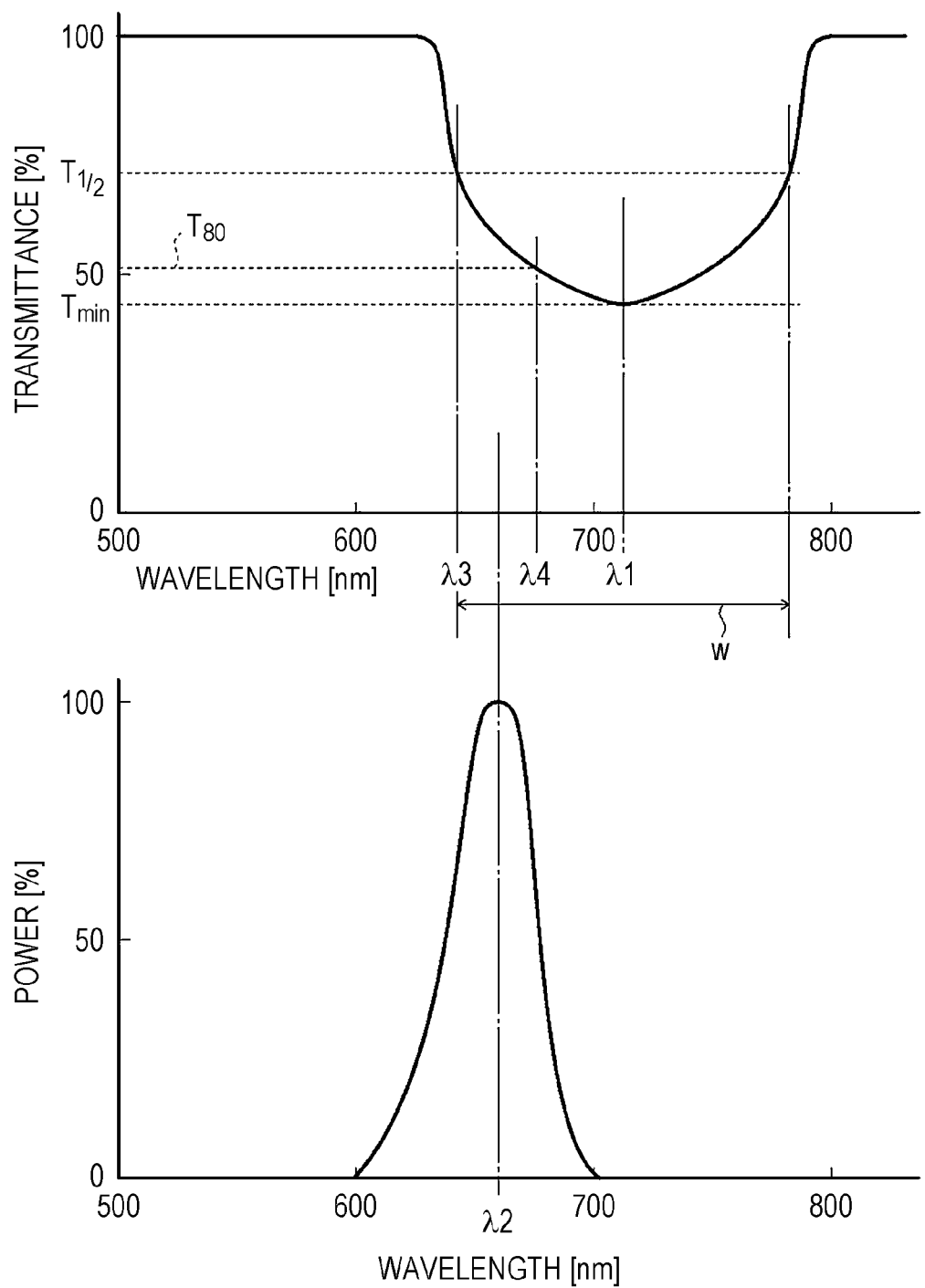
FIG. 2 conceptually illustrates the transmittance characteristics of an example reflective-type circularly polarizing plate used for the plant illumination apparatus according to the present invention and the power characteristics of an example light source used for the plant illumination apparatus according to the present invention.

The upper part of FIG. 2 conceptually illustrates example (light) transmittance characteristics of the reflective-type circularly polarizing plate 16, and the lower part of FIG. 2 conceptually illustrates example power characteristics (emission spectrum characteristics) of the light sources 14.

In FIG. 2, the transmittance characteristics of the reflective-type circularly polarizing plate 16 are normalized, with the maximum transmittance being 100%. In FIG. 2, the power characteristics of the light sources 14 are normalized, with the maximum power (maximum peak) being 100%.

As described above, the reflective-type circularly polarizing plate 16 transmits right-handed circularly polarized light and reflects left-handed circularly polarized light in the effective wavelength range. Alternatively, the reflective-type circularly polarizing plate 16 transmits left-handed circularly polarized light and reflects right-handed circularly polarized light in the effective wavelength range. As shown in FIG. 2, the reflective-type circularly polarizing plate 16 also transmits all light outside the effective wavelength range. For example, if the reflective-type circularly polarizing plate 16 has a cholesteric liquid crystal layer, the effective wavelength range is the wavelength range where the cholesteric liquid crystal layer exhibits selective reflection (selective reflection properties). In the example shown in the figure, the effective wavelength range is from 630 to 800 nm.

As shown in FIG. 2, the illumination apparatus 10 according to the present invention satisfies:

$$\lambda 1 > \lambda 2, \lambda 2 > \lambda 3, \text{ and } w > 30 \text{ nm}$$

wherein $\lambda 1$ is the center wavelength of the effective wavelength range of the reflective-type circularly polarizing plate 16, $\lambda 2$ is the center wavelength of the light sources 14, w is the width between the two wavelengths at the half transmittance $T_{1/2}$ of the minimum transmittance $T_{min}$ of the reflective-type circularly polarizing plate 16, and $\lambda 3$ is the shorter wavelength of the two wavelengths at the half transmittance $T_{1/2}$. The half transmittance $T_{1/2}$ is expressed by the following equation:

$$\text{half transmittance } T_{1/2} = 100 - (100 - T_{min})/2$$

This configuration allows the illumination apparatus 10 according to the present invention to output light having a high degree of circular polarization in the target wavelength range where plant growth is promoted. That is, the illumination apparatus 10 according to the present invention can output light containing an increased proportion of particular circularly polarized light that contributes to plant growth in a particular wavelength range where plant growth can be controlled, thereby irradiating plants with light having a high degree of circular polarization.

As an example, the case where the reflective-type circularly polarizing plate 16 reflects left-handed circularly polarized light and transmits right-handed circularly polarized light will be described below. Thus, the illumination apparatus 10 irradiates plants with right-handed circularly polarized light in the effective wavelength range of the reflective-type circularly polarizing plate 16 and slightly below the effective wavelength range. Light slightly below the effective wavelength range will be described in detail later.

As described above, irradiation with particular circularly polarized light with a particular wavelength promotes plant growth.

As an illumination apparatus for irradiation with such light, a plant illumination apparatus disclosed in JP2012-226229A is known. This plant illumination apparatus includes a light source and a polarization state control member that controls the polarization state of light emitted from the light source. The polarization state control member converts the polarization state of light emitted from the light source into circular polarization in a portion of the wavelength range of the light.

As an example polarization state control member, this plant illumination apparatus uses a reflective-type circularly polarizing plate having a cholesteric liquid crystal layer that reflects left-handed circularly polarized light with a particular wavelength. The effective wavelength range for polarization control is from 580 to 720 nm. Light emitted from the light source is incident on the reflective-type circularly polarizing plate. The reflective-type circularly polarizing plate reflects left-handed circularly polarized light and transmits right-handed circularly polarized light in the wavelength range from 580 to 720 nm, thereby irradiating plants with red right-handed circularly polarized light to promote plant growth.

To promote plant growth, it is preferred that the light sources 14 be selected to have a center wavelength that is the most effective for plant growth.

On the other hand, it is preferred that the center wavelength of the effective wavelength range of the reflective-type circularly polarizing plate match the center wavelength of the light sources so that the reflective-type circularly polarizing plate most properly reflects left-handed circularly polarized light and transmits right-handed circularly polarized light at the center wavelength of the light sources 14.

However, for example, LEDs, which are suitable for use as light sources, emit diffuse light. Thus, as conceptually illustrated in FIG. 1, only a small proportion of the light emitted from the light sources 14 is incident perpendicular to the reflective-type circularly polarizing plate 16 (incident at an incidence angle of 0°), like light L1; a large proportion of the light is obliquely incident on the reflective-type circularly polarizing plate 16, either directly from the light sources 14 or after being reflected by the inner surface 12a of the housing 12, like light L2.

The effective wavelength range of the reflective-type circularly polarizing plate 16 is set for light incident perpendicular to the reflective-type circularly polarizing plate 16. Thus, if light is obliquely incident on the reflective-type circularly polarizing plate 16, the effective wavelength range of the reflective-type circularly polarizing plate 16 is shifted (moved) to shorter wavelengths. For example, although the effective wavelength range (control wavelength range) in the example described above is from 580 to 720 nm, the effective wavelength range is shifted (moved) to shorter wavelengths if light is obliquely incident on the reflective-type circularly polarizing plate 16. As a result, the reflective-type circularly polarizing plate 16 reflects left-handed circularly polarized light in the range from 510 to 650 nm and transmits right-handed circularly polarized light in the range from 510 to 650 nm.

Thus, right-handed circularly polarized light with which plants are irradiated by known illumination apparatuses contains a large proportion of light with wavelengths different from the target wavelength that contributes to plant growth, depending on factors such as the type of light source and the shape of the reflective plate. That is, the degree of circular polarization is low in the target wavelength range, which decreases the degree of promotion of plant growth.

In contrast, as described above, the illumination apparatus 10 according to the present invention satisfies $\lambda 1 > \lambda 2$, $\lambda 2 > \lambda 3$, and $w > 30$ nm, wherein $\lambda 1$ is the center wavelength of the effective wavelength range of the reflective-type circularly polarizing plate 16, $\lambda 2$ is the center wavelength of the light sources 14, w is the width between the two wavelengths at the half transmittance $T_{1/2}$ of the minimum transmittance $T_{min}$ of the reflective-type circularly polarizing plate 16, and $\lambda 3$ is the shorter wavelength of the two wavelengths at the half transmittance $T_{1/2}$.

That is, the center wavelength $\lambda 1$ of the effective wavelength range of the reflective-type circularly polarizing plate 16 of the illumination apparatus 10 according to the present invention is set to be longer than the center wavelength $\lambda 2$ of the light sources 14, which is the best wavelength for irradiation of plants, and the effective wavelength range of the reflective-type circularly polarizing plate 16 is set so that the center wavelength $\lambda 2$ of the light sources 14 falls within the wavelength range corresponding to the half transmittance $T_{1/2}$.

As described above, a large proportion of light is obliquely incident on the reflective-type circularly polarizing plate 16 of the illumination apparatus 10. Thus, when the reflection wavelength range of the reflective-type circularly polarizing plate 16 of the illumination apparatus 10 according to the present invention is shifted to shorter wavelengths due to oblique incidence of light, a large proportion of the light, transmitted through the reflective-type circularly polarizing plate 16, with which plants are irradiated is right-handed circularly polarized light in the target wavelength range for irradiation of plants, which is close to the center wavelength $\lambda 2$ of the light sources 14. That is, the illumination apparatus 10 according to the present invention can irradiate plants with right-handed circularly polarized light having a high degree of circular polarization in the target wavelength range for irradiation of plants.

As is well known, circularly polarized light changes its rotational direction upon each reflection. Thus, the light emitted from the light sources 14 in the target range for irradiation of plants is eventually converted into right-handed circularly polarized light and is incident on the reflective-type circularly polarizing plate 16. Thus, the illumination apparatus 10 according to the present invention can output a large proportion of the light emitted from the light sources 14 in the target wavelength range for irradiation of plants as right-handed circularly polarized light and can irradiate plants with the light.

If the center wavelength $\lambda 1$ of the effective wavelength range of the reflective-type circularly polarizing plate 16 of the illumination apparatus 10 according to the present invention is shorter than or equal to the center wavelength $\lambda 2$ of the light sources 14, that is, if $\lambda 1$ $\lambda 2$, the wavelength of the right-handed circularly polarized light transmitted through the reflective-type circularly polarizing plate 16 would become significantly shorter than the center wavelength $\lambda 2$ when the reflection wavelength range of the reflective-type circularly polarizing plate 16 is shifted to shorter wavelengths due to oblique incidence of light. This would make it impossible to output right-handed circularly polarized light in the target wavelength range.

$\lambda 1$ and $\lambda 2$ preferably satisfy $\lambda 1 - \lambda 2 > 10$ nm, more preferably $\lambda 1 - \lambda 2 > 20$ nm, even more preferably $\lambda 1 - \lambda 2 > 30$ nm, so that, for example, the degree of circular polarization can be improved in the target wavelength range, and the reflective-type circularly polarizing plate 16 can act effectively on obliquely incident light.

Furthermore, $\lambda 1$ and $\lambda 2$ preferably satisfy $\lambda 1 - \lambda 2 < 300$ nm, more preferably $\lambda 1 - \lambda 2 < 200$ nm, even more preferably $\lambda 1 - \lambda 2 < 100$ nm, so that, for example, the degree of circular polarization can be improved in the target wavelength range, and the reflective-type circularly polarizing plate 16 can act effectively on obliquely incident light.

In view of the foregoing and the preferred center wavelength $\lambda 2$ of the light sources 14 described above, it is preferred that the center wavelength $\lambda 1$ of the effective wavelength range of the reflective-type circularly polarizing plate 16 be 570 to 1,060 nm, more preferably 580 to 960 nm, even more preferably 590 to 860 nm.

In the present invention, if the shorter wavelength $\lambda 3$ of the two wavelengths at the half transmittance $T_{1/2}$ is longer than or equal to the center wavelength $\lambda 2$ of the light sources 14, that is, if $\lambda 2 \le \lambda 3$, the center wavelength $\lambda 2$ of the light sources 14 would deviate significantly from the center wavelength $\lambda 1$ of the effective wavelength range of the reflective-type circularly polarizing plate 16. In some cases, the center wavelength $\lambda 2$ of the light sources 14 would be shorter than the effective wavelength range of the reflective-type circularly polarizing plate 16.

In this case, some disadvantages would be encountered. For example, the wavelength of the right-handed circularly polarized light transmitted through the reflective-type circularly polarizing plate 16 would not fall within the target wavelength range even though the reflection wavelength range of the reflective-type circularly polarizing plate 16 is shifted to shorter wavelengths due to oblique incidence of light. In addition, the intensity of the transmitted light would decrease.

$\lambda 2$ and $\lambda 3$ preferably satisfy $\lambda 2 - \lambda 3 = 300$ to 10 nm, more preferably $\lambda 2 - \lambda 3 = 200$ to 20 nm, so that, for example, right-handed circularly polarized light can be appropriately output in the target wavelength range.

In the present invention, as shown in FIG. 2, the center wavelength $\lambda 2$ of the light sources 14 and $\lambda 4$ preferably satisfy:

$$\lambda 2 < \lambda 4$$

wherein $\lambda 4$ is the shorter wavelength of the wavelengths at the transmittance $T_{80}$ expressed by the following equation:

$$\text{transmittance } T_{80} = 100 - (100 - T_{min}) \times 0.8$$

In the present invention, this configuration allows the reflection wavelength range of the reflective-type circularly polarizing plate 16 to be appropriately brought close to the center wavelength $\lambda 2$ when the reflection wavelength range of the reflective-type circularly polarizing plate 16 is shifted to shorter wavelengths due to oblique incidence of light. Thus, in the present invention, this configuration is preferred in that, for example, the degree of circular polarization can be improved in the target wavelength range, and the reflective-type circularly polarizing plate 16 can act effectively on obliquely incident light.

To appropriately achieve the above advantage, $\lambda 2$ and $\lambda 4$ preferably satisfy $\lambda 4 - \lambda 2 = 300$ to 10 nm, more preferably $\lambda 4 - \lambda 2 = 200$ to 20 nm.

If the width w between the two wavelengths at the half transmittance $T_{1/2}$ is not more than 30 nm in the illumination apparatus 10 according to the present invention, some disadvantages would be encountered. For example, the wavelength of the right-handed circularly polarized light transmitted through the reflective-type circularly polarizing plate 16 would not fall within the target wavelength range even though the reflection wavelength range of the reflective-type circularly polarizing plate 16 is shifted to shorter wavelengths due to oblique incidence of light.

The width w is preferably 50 nm or more, more preferably 70 nm or more, so that, for example, right-handed circularly polarized light can be appropriately output in the target wavelength range.

It is not necessary to set an upper limit to the width w. However, for example, if the reflective-type circularly polarizing plate 16 has a cholesteric liquid crystal layer, a larger number of cholesteric liquid crystal layers need to be stacked in order to increase the wavelength width w, which is disadvantageous in terms of, for example, the cost of the reflective-type circularly polarizing plate 16 and the time and effort required for its fabrication.

In view of this, the width w is preferably 300 nm or less, more preferably 200 nm or less.

The illumination apparatus 10 according to the present invention preferably has a diffusion plate and/or a retardation plate between the light sources 14 and the reflective-type circularly polarizing plate 16.

It is preferred that the illumination apparatus 10 according to the present invention have a diffusion plate and/or a retardation plate between the light sources 14 and the reflective-type circularly polarizing plate 16 since light reflected by the reflective-type circularly polarizing plate 16 can be depolarized for recycling, thereby increasing the light recycling efficiency.

The phase difference in the in-plane direction of the retardation plate (in-plane retardation Re) is preferably 300 nm or more, more preferably 1,000 nm or more, for a wavelength of 550 nm. If the phase difference in the in-plane direction is 300 nm or more for a wavelength of 550 nm, a sufficient depolarization effect can be achieved, thus improving the light recycling efficiency.

The diffusion plate and/or the retardation plate may serve as a base substrate for the reflective-type circularly polarizing plate 16. The diffusion plate and/or the retardation plate may contain a UV absorber.

In addition to the light sources 14, whose center wavelength $\lambda 2$ satisfies $\lambda 1 > \lambda 2$ and $\lambda 2 > \lambda 3$, the illumination apparatus 10 according to the present invention may further include a second light source (second light-emitting device) whose center wavelength does not satisfy $\lambda 1 > \lambda 2$ and/or does not satisfy $\lambda 2 > \lambda 3$.

In this case, preferred examples of light sources include light sources whose central emission wavelength is shorter than the effective wavelength range of the reflective-type circularly polarizing plate 16, more preferably light sources that emit blue light, particularly preferably light sources whose center wavelength is 450 nm.

As described above, red light is suitable for promoting plant growth (weight increase). On the other hand, blue light, particularly blue light having a center wavelength of 450 nm, is suitable for controlling plant shape. Thus, if the illumination apparatus 10 has such a light source in addition to the light sources 14, it is possible to promote plant growth and to produce nicely shaped plants.

The ratio of the intensity of light emitted from the second light source to the intensity of light emitted from the light sources 14 may be, for example, about 1:10.

The various light sources (light-emitting elements) listed as examples of the light sources 14 may be used as the second light source.

The illumination apparatus 10 according to the present invention irradiates plants with right-handed circularly polarized light (or left-handed circularly polarized light) in the wavelength range effective for plant growth to promote and control plant growth. A possible mechanism concerning the illumination apparatus 10 according to the present invention is as follows.

Photoreceptors such as phytochromes, cryptochromes, phototropins, and ZEITLUPE (ZTL), which are involved in, for example, the flower-bud formation promotion, inhibition, and growth control of plants, contain the chromophores phytochromobilin and flavin, which serve as chiral agents and thus exhibit absorption dichroism for circularly polarized light in and around the light absorption wavelength range. That is, the photoreceptors more easily absorb either left- or right-handed circularly polarized light and less easily absorb circularly polarized light of opposite sense; therefore, it is difficult to induce the function of the photoreceptors by irradiation with circularly polarized light of opposite sense. Thus, it is probable that irradiation with either left- or right-handed circularly polarized light alone causes the phenomenon where growth varies. However, this absorption dichroism is a phenomenon that can be observed in a solution system on a laboratory level; in practice, it is generally thought that the phenomenon described above does not appear because the polarization state is disturbed as the polarized light is scattered by intracellular substances before reaching the chromophores. Surprisingly, however, it has been found that, according to the present invention, plant growth can be controlled depending on the polarization state of irradiation light even in leaves and stems, where the photoreceptors are present.

Phytochromes, which are involved in plant photoperiodism, are present in the red-light absorbing form, which has a maximum absorption around 650 nm, or the far-red-light absorbing form, which has a maximum absorption around 750 nm. Irradiation with light around 650 nm converts the red-light absorbing form into the far-red-light absorbing form, whereas irradiation with light around 750 nm converts the far-red-light absorbing form into the red-light absorbing form. The conversion of the far-red-light absorbing form into the red-light absorbing form also proceeds in dark conditions over time. The amount of far-red-light absorbing form produced by these reactions controls when plants bloom. These reactions can be artificially controlled to control when plants bloom, for example, as in nighttime illumination for the culture of plants such as *chrysanthemum*. If the illumination apparatus 10 according to the present invention is used for such illumination as a light source that emits right-handed circularly polarized light, which is absorbed by phytochromes, only in the absorption wavelength range of phytochromes, the required power consumption can be reduced without decreasing the effect of electric illumination.

Since there are various plants and numerous types of chromophores on earth, it is important to change the wavelength range where circularly polarized light is output and the sense of the circularly polarized light depending on factors such as the type of plant and/or the purpose of control. It may, of course, be preferred in some cases to simultaneously irradiate plants with circularly polarized light of different senses, for example, right-handed circularly polarized light in one wavelength range and left-handed circularly polarized light in another wavelength range. The illumination apparatus 10 according to the present invention can also be used for such purposes.

The wavelength range of the circularly polarized light output from the illumination apparatus 10 according to the present invention may be changed by exchanging the reflective-type circularly polarizing plate 16 depending on the stage of the plant growth cycle, such as dormancy, germination, seedling, cell growth period, or flower-bud differentiation. In addition, irradiation timing, light intensity, polarization state, and other conditions may be adjusted depending on the stage of the diurnal cycle. Furthermore, for example, pulsed light may be used, and light with different polarization states may be used for different parts of the plants to be irradiated. In plant factories, irradiation with light by the illumination apparatus 10 according to the present invention may be combined with humidity, temperature, and gas concentration control.

The target plant for the illumination apparatus 10 according to the present invention may be any suitable plant selected depending on the purpose.

Examples of plants include vegetables in the Cucurbitaceae family, the Solanaceae family, the Fabaceae family, the Rosaceae family, the Brassicaceae family, the Asteraceae family, the Apiaceae family, the Chenopodiaceae family, the Poaceae family, the Malvaceae family, the Araliaceae family, the Lamiaceae family, the Zingiberaceae family, the Nymphaeaceae family, and the Araceae family; flowering plants for cutting and potting in the Asteraceae family, the Rosaceae family, the Araceae family, the Caryophyllaceae family, the Brassicaceae family, the Plumbaginaceae family, the Gentianaceae family, the Scrophulariaceae family, the Fabaceae family, the Paeoniaceae family, the Iridaceae family, the Solanaceae family, the Amaryllidaceae family, the Orchidaceae family, the Agavaceae family, the Cornaceae family, the Rubiaceae family, the Salicaceae family, the Ericaceae family, the Oleaceae family, the Magnoliaceae family, the Primulaceae family, the Begoniaceae family, the Lamiaceae family, the Geraniaceae family, the Crassulaceae family, the Ranunculaceae family, the Gesneriaceae family, the Cactaceae family, the fern family, the Araliaceae family, the Moraceae family, the Commelinaceae family, the Bromeliaceae family, the Marantaceae family, the Euphorbiaceae family, the Piperaceae family, the Saxifragaceae family, the Onagraceae family, the Malvaceae family, the Myrtaceae family, the Theaceae family, and the Nyctaginaceae family; fruit trees in the Rosaceae family, the Vitaceae family, the Moraceae family, the Ebenaceae family, the Ericaceae family, the Lardizabalaceae family, the Actinidiaceae family, the Passifloraceae family, the Rutaceae family, the Anacardiaceae family, the Bromeliaceae family, and the Myrtaceae family; and algae.

Specific examples include vegetables such as cucumbers, melons, squashes, bitter gourds, zucchinis, watermelons, oriental pickling melons, wax gourds, sponge gourds, spaghetti squashes, tomatoes, green peppers, red peppers, eggplants, pepinos, shishito peppers, peas, green beans, cowpeas, green soybeans, broad beans, winged beans, podded peas, podded green beans, hyacinth beans, strawberries, corn, okra, broccoli, radish sprouts, watercress, komatsuna, tukena, lettuce, giant butterbur, crown daisy, edible *chrysanthemum*, celery, parsley, mitsuba, seri, negi, wakegi, Chinese chive, asparagus, spinach, saltwort, *udo*, shiso, ginger, daikon, turnips, wasabi, radishes, rutabaga, kokabu, garlic, rakkyo, root lotus, and taro; flowering plants such as aster, rhodanthe, thistle, *dianthus*, stock, canola, statice, *eustoma*, snapdragon, sweet pea, Japanese iris, *chrysanthemum*, liatris, *gerbera*, marguerite, gymnaster, Shasta daisy, carnation, baby's-breath, Japanese gentian, Chinese peony, bladder cherry, chelone, dahlia, calla, *gladiolus*, iris, freesia, tulip, *narcissus*, amaryllis, cymbidium, dracaena, rose, Japanese quince, cherry blossom, peach, ume, reeves spirea, bramble, Japanese rowan, dogwood, Japanese cornel, Chinese *ixora*, bouvardia, willow, azalea, forsythia, lily *magnolia*, *cineraria*, *dimorphotheca*, *primula*, *petunia*, *begonia*, *coleus*, geranium, *pelargonium*, rochea, anthurium, *clematis*, lily-of-the-valley, saintpaulia, cyclamen, *ranunculus*, *gloxinia*, dendrobium, cattleya, phalaenopsis, vanda, epidendrum, oncidium, schlumbergera *truncata*, schlumbergera russeliana, epiphyllum, kalanchoe, *nephrolepis*, adiantum, asplenium, pothos, dieffenbachia, spathiphyllum, *syngonium*, spider plant, *schefflera, hedera*, rubber tree, *cordyline*, bridal veil, *ananas*, calathea, croton, peperomia, poinsettia, *hydrangea*, fuchsia, hibiscus, *gardenia*, manuka, *camellia, bougainvillea*, and tree peony; fruit trees such as Japanese pears, peaches, cherries, plums, apples, prunes, nectarines, apricots, raspberries, ume, grapes, figs, persimmons, blueberries, chocolate vines, kiwi fruit, passion fruit, loquats, citrus unshiu, murcotts, lemons, yuzu, Buddha's hand, hassaku, pomelos, hanayuzu, kumquats, seminole, iyokan, navel oranges, encore, nova, hyuganatsu, limes, sudachi, kabosu, banpeiyu, tankan, mangoes, pineapples, and guavas; and algae.

Preferred of these are leaf vegetables, particularly komatsuna, which is a type of tukena in the Brassicaceae family.

Although the plant illumination apparatus according to the present invention has been described in detail above, the present invention is not limited to the foregoing example; it should be appreciated that various improvements and modifications may be made without departing from the spirit of the invention.

For example, although the reflective-type circularly polarizing plate 16 in the foregoing example reflects left-handed circularly polarized light and transmits right-handed circularly polarized light in the effective wavelength range, the present invention is not limited thereto; instead, the reflective-type circularly polarizing plate 16 may reflect right-handed circularly polarized light and transmit left-handed circularly polarized light in the effective wavelength range.

EXAMPLES

The following examples are given to more specifically describe the features of the present invention. The materials, reagents, amounts used, amounts of substance, proportions, processes, process sequences, and other details given in the following examples can be changed as appropriate without departing from the spirit of the invention. Thus, the specific examples given below should not be construed as limiting the scope of the invention.

Example 1

Preparation of Cholesteric Liquid Crystal Coating Solution

Polymerizable Liquid Crystal Compound 1 below, Polymerizable Liquid Crystal Compound 2 below, a chiral agent (Paliocolor LC765 from BASF), the alignment control agent below, and a polymerization initiator (Irgacure 819 from Ciba Specialty Chemicals) were added to chloroform to prepare a cholesteric liquid crystal coating solution for the fabrication of the reflective-type circularly polarizing plate 16.

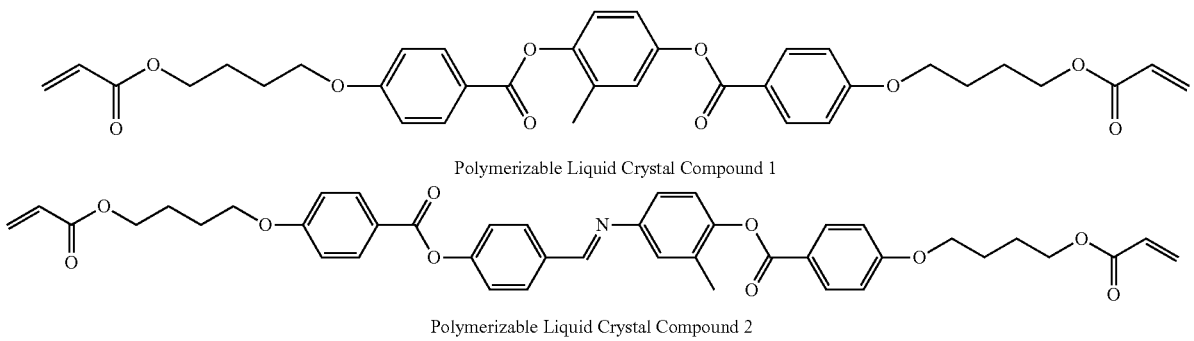

Polymerizable Liquid Crystal Compound 1

Polymerizable Liquid Crystal Compound 2

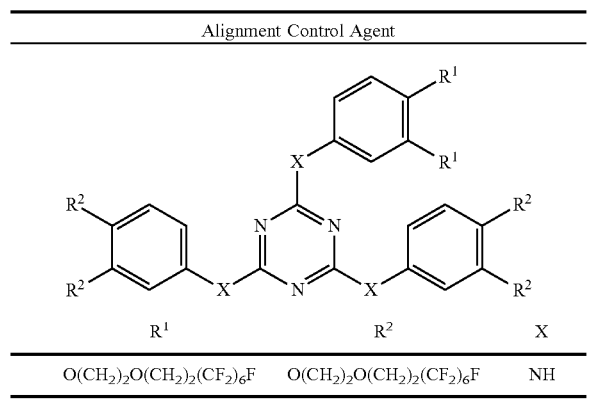

| Alignment Control Agent |
|---|
| $R^1$ | $R^2$ | X |
| $O(CH_2)_2O(CH_2)_2(CF_2)_6F$ | $O(CH_2)_2O(CH_2)_2(CF_2)_6F$ | NH |

Fabrication of Reflective-Type Circularly Polarizing Plate

The resulting cholesteric liquid crystal coating solution was applied to a polyethylene terephthalate (PET) film, available from Fujifilm Corporation, that had been subjected to rubbing treatment with a wire bar at room temperature so that the thickness after drying was 3.5 μm. This PET film had a phase difference in the in-plane direction (in-plane retardation Re) of 2,000 nm or more for a wavelength of 550 nm.

After the cholesteric liquid crystal coating solution applied to the PET film was dried at room temperature for 30 seconds, the coating was heated in an atmosphere at 100° C. for 2 minutes and was then irradiated with ultraviolet light at 30° C. with a D-bulb lamp (90 mW/cm) available from Fusion UV Systems at a power of 60% for 12 seconds to fix the cholesteric liquid crystal layer. Thus, a reflective-type circularly polarizing plate 16 was fabricated.

The sense of the cholesteric liquid crystal of the resulting reflective-type circularly polarizing plate 16 was left-handed. Thus, this reflective-type circularly polarizing plate 16 reflected left-handed circularly polarized light and transmitted right-handed circularly polarized light.

The transmittance characteristics of the resulting reflective-type circularly polarizing plate 16 were measured with a spectrophotometer (Jasco V-550 from Jasco Corporation).

As a result, the effective wavelength range was from 630 to 750 nm, and the width of the effective wavelength range was 120 nm.

The center wavelength λ1 of the effective wavelength range was 690 nm.

The shorter wavelength λ3 of the wavelengths at the half transmittance $T_{1/2}$ was 640 nm.

The width w between the wavelengths at the half transmittance $T_{1/2}$ was 100 nm.

The shorter wavelength λ4 of the wavelengths at the transmittance $T_{80}$ was 670 nm.

Example 2

A reflective-type circularly polarizing plate 16 was fabricated as in Example 1 except that Polymerizable Liquid Crystal Compound 1, Polymerizable Liquid Crystal Compound 2, and the chiral agent were added in a different ratio in the preparation of a cholesteric liquid crystal coating solution for the fabrication of the reflective-type circularly polarizing plate 16.

The transmittance characteristics of the resulting reflective-type circularly polarizing plate were measured as in Example 1.

As a result, the effective wavelength range was from 630 to 800 nm, and the width of the effective wavelength range was 170 nm.

The center wavelength λ1 of the effective wavelength range was 715 nm.

The shorter wavelength λ3 of the wavelengths at the half transmittance $T_{1/2}$ was 640 nm.

The width w between the wavelengths at the half transmittance $T_{1/2}$ was 150 nm.

The shorter wavelength λ4 of the wavelengths at the transmittance $T_{80}$ was 695 nm.

Example 3

A reflective-type circularly polarizing plate 16 was fabricated as in Example 1 except that Polymerizable Liquid Crystal Compound 1, Polymerizable Liquid Crystal Compound 2, and the chiral agent were added in a different ratio in the preparation of a cholesteric liquid crystal coating solution for the fabrication of the reflective-type circularly polarizing plate 16.

The transmittance characteristics of the resulting reflective-type circularly polarizing plate were measured as in Example 1.

As a result, the effective wavelength range was from 620 to 740 nm, and the width of the effective wavelength range was 120 nm.

The center wavelength λ1 of the effective wavelength range was 680 nm.

The shorter wavelength λ3 of the wavelengths at the half transmittance $T_{1/2}$ was 630 nm.

The width w between the wavelengths at the half transmittance $T_{1/2}$ was 100 nm.

The shorter wavelength λ4 of the wavelengths at the transmittance $T_{80}$ was 660 nm.

Comparative Example 1

A reflective-type circularly polarizing plate 16 was fabricated as in Example 1 except that Polymerizable Liquid Crystal Compound 1, Polymerizable Liquid Crystal Compound 2, and the chiral agent were added in a different ratio in the preparation of a cholesteric liquid crystal coating solution for the fabrication of the reflective-type circularly polarizing plate 16.

The transmittance characteristics of the resulting reflective-type circularly polarizing plate were measured as in Example 1.

As a result, the effective wavelength range was from 600 to 720 nm, and the width of the effective wavelength range was 120 nm.

The center wavelength $\lambda 1$ of the effective wavelength range was 660 nm.

The shorter wavelength $\lambda 3$ of the wavelengths at the half transmittance $T_{1/2}$ was 610 nm.

The width w between the wavelengths at the half transmittance $T_{1/2}$ was 100 nm.

The shorter wavelength $\lambda 4$ of the wavelengths at the transmittance $T_{80}$ was 640 nm.

Comparative Example 2

A reflective-type circularly polarizing plate 16 was fabricated as in Example 1 except that Polymerizable Liquid Crystal Compound 1, Polymerizable Liquid Crystal Compound 2, and the chiral agent were added in a different ratio in the preparation of a cholesteric liquid crystal coating solution for the fabrication of the reflective-type circularly polarizing plate 16.

The transmittance characteristics of the resulting reflective-type circularly polarizing plate were measured as in Example 1.

As a result, the effective wavelength range was from 670 to 790 nm, and the width of the effective wavelength range was 120 nm.

The center wavelength $\lambda 1$ of the effective wavelength range was 730 nm.

The shorter wavelength $\lambda 3$ of the wavelengths at the half transmittance $T_{1/2}$ was 680 nm.

The width w between the wavelengths at the half transmittance $T_{1/2}$ was 100 nm.

The shorter wavelength $\lambda 4$ of the wavelengths at the transmittance $T_{80}$ was 710 nm.

Comparative Example 3

A reflective-type circularly polarizing plate 16 was fabricated as in Example 1 except that Polymerizable Liquid Crystal Compound 1, Polymerizable Liquid Crystal Compound 2, and the chiral agent were added in a different ratio in the preparation of a cholesteric liquid crystal coating solution for the fabrication of the reflective-type circularly polarizing plate 16.

The transmittance characteristics of the resulting reflective-type circularly polarizing plate were measured as in Example 1.

As a result, the effective wavelength range was from 635 to 685 nm, and the width of the effective wavelength range was 50 nm.

The center wavelength $\lambda 1$ of the effective wavelength range was 660 nm.

The shorter wavelength $\lambda 3$ of the wavelengths at the half transmittance $T_{1/2}$ was 645 nm.

The width w between the wavelengths at the half transmittance $T_{1/2}$ was 30 nm.

The shorter wavelength $\lambda 4$ of the wavelengths at the transmittance $T_{80}$ was 650 nm.

Comparative Example 4

A reflective-type circularly polarizing plate 16 was fabricated as in Example 1 except that Polymerizable Liquid Crystal Compound 1, Polymerizable Liquid Crystal Compound 2, and the chiral agent were added in a different ratio in the preparation of a cholesteric liquid crystal coating solution for the fabrication of the reflective-type circularly polarizing plate 16.

The transmittance characteristics of the resulting reflective-type circularly polarizing plate were measured as in Example 1.

As a result, the effective wavelength range was from 570 to 690 nm, and the width of the effective wavelength range was 120 nm.

The center wavelength $\lambda 1$ of the effective wavelength range was 630 nm.

The shorter wavelength $\lambda 3$ of the wavelengths at the half transmittance $T_{1/2}$ was 580 nm.

The width w between the wavelengths at the half transmittance $T_{1/2}$ was 100 nm.

The shorter wavelength $\lambda 4$ of the wavelengths at the transmittance $T_{80}$ was 610 nm.

Evaluation

Next, as shown in FIG. 1, each resulting reflective-type circularly polarizing plate 16 was placed on the emission front side of a red LED lamp (center wavelength=660 nm) to fabricate a plant illumination apparatus. Thus, the center wavelength $\lambda 2$ of the light-emitting device was 660 nm.

Komatsuna was cultured while being irradiated with light from this plant illumination apparatus in an environment at 25° C. for 38 consecutive days. Thereafter, the komatsuna was weighed, and the weight increase from the weight before irradiation was determined.

The results are summarized in the following table.

TABLE 1

| | | Example 1 | Example 2 | Example 3 | Comparative Example 1 | Comparative Example 2 | Comparative Example 3 | Comparative Example 4 |
|---|---|---|---|---|---|---|---|---|
| Light source | Wavelength $\lambda 2$ (nm) | 660 | 660 | 660 | 660 | 660 | 660 | 660 |
| Circularly polarizing reflective plate | Effective wavelength range | 630-750 | 630-800 | 620-740 | 600-720 | 670-790 | 635-685 | 570-690 |
| | Width of effective wavelength range (nm) | 120 | 170 | 120 | 120 | 120 | 50 | 120 |
| | Wavelength $\lambda 1$ (nm) | 690 | 715 | 680 | 660 | 730 | 660 | 630 |
| | Wavelength $\lambda 3$ (nm) | 640 | 640 | 630 | 610 | 680 | 645 | 580 |

TABLE 1-continued

|  | Example 1 | Example 2 | Example 3 | Comparative Example 1 | Comparative Example 2 | Comparative Example 3 | Comparative Example 4 |
| --- | --- | --- | --- | --- | --- | --- | --- |
| Wavelength width w (nm) | 100 | 150 | 100 | 100 | 100 | 30 | 100 |
| Wavelength λ4 (nm) | 670 | 695 | 660 | 640 | 710 | 650 | 610 |
| Weight increase of komatsuna (g) | 16 | 18 | 15 | 12 | 13 | 11 | 11 |

The above results demonstrate the advantages of the present invention.

The present invention is suitable for use in plant production.

REFERENCE SIGNS LIST 10 (plant) illumination apparatus
12 housing
12a inner surface
14 light source
16 reflective-type circularly polarizing plate
18 support
L1, L2 light

What is claimed is:

1. A plant illumination apparatus comprising:
a reflective-type polarizing plate having an effective wavelength range and reflecting particular polarized light in the effective wavelength range;
a light-emitting device that emits light including light in the effective wavelength range of the reflective polarizing plate; and
a reflective plate configured to reflect light emitted from the light-emitting device and light reflected by the reflective-type polarizing plate,
the plant illumination apparatus satisfying:

$$\lambda 1 > \lambda 2, \lambda 2 > \lambda 3, \text{ and } w > 30 \text{ nm}$$

wherein λ1 is a center wavelength of the effective wavelength range of the reflective-type polarizing plate, λ2 is a center wavelength of the emission of the light-emitting device, w is a width between two wavelengths at a half transmittance $T_{1/2}$ of a minimum transmittance $T_{min}$ of the reflective-type polarizing plate, and λ3 is a shorter wavelength of the two wavelengths at the half transmittance $T_{1/2}$, the half transmittance $T_{1/2}$ being expressed by the following equation:

$$\text{half transmittance } T_{1/2} = 100 - (100 - T_{min})/2.$$

2. The plant illumination apparatus according to claim 1, wherein λ2 and λ4 satisfy:

$$\lambda 2 < \lambda 4$$

wherein λ4 is a shorter wavelength of wavelengths at a transmittance $T_{80}$ of the reflective-type polarizing plate, the transmittance $T_{80}$ being expressed by the following equation:

$$\text{transmittance } T_{80} = 100 - (100 - T_{min}) \times 0.8.$$

3. The plant illumination apparatus according to claim 1, wherein λ1 and λ2 satisfy:

$$\lambda 1 - \lambda 2 > 10 \text{ nm}.$$

4. The plant illumination apparatus according to claim 1, wherein λ1 and λ2 satisfy:

$$\lambda 1 - \lambda 2 < 300 \text{ nm}.$$

5. The plant illumination apparatus according to claim 1, wherein the reflective-type polarizing plate is a reflective-type circularly polarizing plate.

6. The plant illumination apparatus according to claim 5, wherein the reflective-type circularly polarizing plate has a cholesteric liquid crystal layer or has a linearly polarizing reflective plate and a λ/4 plate.

7. The plant illumination apparatus according to claim 1, wherein the reflective plate reflects the light emitted from the light-emitting device by specular reflection or diffuse reflection.

8. The plant illumination apparatus according to claim 1, wherein λ2 is 560 to 760 nm.

* * * * *